(12) United States Patent
Povolny et al.

(10) Patent No.: US 9,741,179 B2
(45) Date of Patent: Aug. 22, 2017

(54) ONBOARD UNIT FOR A VEHICULAR IDENTIFICATION SYSTEM

(71) Applicant: Kapsch TrafficCom AG, Vienna (AT)

(72) Inventors: Robert Povolny, Vienna (AT); Joze Hebar, Maribor (SI)

(73) Assignee: Kapsch TrafficCom AG, Vienna (AT)

( * ) Notice: Subject to any disclaimer, the term of this patent is extended or adjusted under 35 U.S.C. 154(b) by 0 days.

(21) Appl. No.: 15/093,488

(22) Filed: Apr. 7, 2016

(65) Prior Publication Data

US 2016/0300401 A1    Oct. 13, 2016

(30) Foreign Application Priority Data

Apr. 10, 2015  (EP) .................................... 15163155

(51) Int. Cl.
| | | |
|---|---|---|
| *G07B 15/06* | (2011.01) | |
| *G08G 1/017* | (2006.01) | |
| *G06K 7/10* | (2006.01) | |
| *H04W 4/00* | (2009.01) | |
| *H04W 12/06* | (2009.01) | |

(52) U.S. Cl.
CPC ....... *G07B 15/063* (2013.01); *G06K 7/10366* (2013.01); *G08G 1/017* (2013.01); *H04W 4/008* (2013.01); *H04W 12/06* (2013.01)

(58) Field of Classification Search
CPC .. G07B 15/063; G06K 7/10366; G08G 1/017; H04W 4/008; H04W 12/06; B60T 1/005
USPC ....................................................... 340/10.1
See application file for complete search history.

(56) References Cited

U.S. PATENT DOCUMENTS

| 8,754,750 B2 * | 6/2014 | Welch ................... G07B 15/063 |
| | | 340/10.1 |
| 2013/0033381 A1 * | 2/2013 | Breed ..................... B60T 1/005 |
| | | 340/568.1 |

FOREIGN PATENT DOCUMENTS

| DE | 4412140 C1 | 4/1995 |
| GB | 2278704 A | 12/1994 |
| GB | 2510869 A | 8/2014 |

OTHER PUBLICATIONS

Extended European Search Report (includes Partial European Search Report and European Search Opinion) received for European Patent Application No. 15163155.3, mailed on Oct. 9, 2015, 7 pages.

* cited by examiner

*Primary Examiner* — Ali Neyzari
(74) *Attorney, Agent, or Firm* — Fiala & Weaver P.L.L.C.

(57) ABSTRACT

An onboard unit for a vehicular identification system is disclosed herein. The onboard unit comprises a housing attachable to an exterior surface of a vehicle's windscreen, a transceiver, and a processor coupled to the transceiver and configured to communicate with the identification system via the transceiver. The transceiver and processor are contained in the housing. The onboard unit comprises a tampering protection unit which is split into a first part which is contained in the housing and a second part which is attachable to an inner surface of the windscreen. The first and the second part each comprise a limited range communication module for communication between each other. The tampering protection unit is configured to detect a loss of communication between both communication modules and, upon detection, to trigger an alarm event.

23 Claims, 3 Drawing Sheets

ONBOARD UNIT FOR A VEHICULAR IDENTIFICATION SYSTEM

CROSS-REFERENCE TO RELATED APPLICATION(S)

This application claims priority to European Patent Application No. 15 163 155.3, filed on Apr. 10, 2015, the entirety of which is incorporated by reference herein.

BACKGROUND

Technical Field

The present subject matter relates to an onboard unit for a vehicular identification system, in particular a road toll, parking space management or access system.

Background Art

A conventional vehicular identification system typically has a data processing centre and, connected thereto, one or more transceivers for communication with onboard units of the abovementioned type which are attached to vehicles passing one of the transceivers of the identification system. Depending on the type of identification system and on the onboard units in use, the transceivers of the identification system can, e.g., be base transceiver stations (BTS) of a cellular phone network and/or short range communication transceivers according to DSRC, WAVE or similar standards.

Such identification systems authorise the use of a toll road or a parking space or the access to a restricted area upon an individual identification of the onboard unit, upon the identification of the vehicle (i.e. its onboard unit or user) being affiliated to an admissible group of vehicles, e.g. a vehicle fleet having access to a restricted area, and/or upon collecting a utilization fee, e.g. a parking or toll fee.

An onboard unit for such vehicular identification systems is generally mounted in the interior of the vehicle, mostly attached to the vehicle's windscreen, and is thereby protected from harsh exterior environmental conditions. Nowadays, an increasing percentage of vehicles is equipped with a windscreen which is coated with metal as an irradiation protector in order to block radiation in the infrared wavelength spectrum of the day light. Furthermore heating wires are often integrated into the glass of the windscreen for defrosting purposes, having a very similar effect as the metallisation of the windscreen: Such wires or metallisation substantially attenuate or even completely block radio communication through the windscreen; the radio communication of onboard units attached thereto is therefore at least prone to errors if not completely inhibited.

A possible remedy thereto is to relocate the antenna of the onboard unit to the outside of the vehicle. This provision requires extra cabling through the car body and reduces the ease and flexibility of use of the onboard unit. Another known solution to said problem is to provide the onboard unit with a weatherproof housing and attach it to the exterior surface of the vehicle, in which case the onboard unit is exposed to tampering and improper use by unauthorised third parties.

BRIEF SUMMARY

It is an object of the disclosed subject matter to provide an onboard unit which can easily and flexibly be mounted to the vehicle and reliably and securely be used also with vehicles having metallised windscreens.

This object is achieved with an onboard unit of the type mentioned at the outset; in particular, an onboard unit for use with a vehicular identification system, comprising:
a housing attachable to an exterior surface of a windscreen of a vehicle;
a transceiver for radio communication with the identification system; and
a processor coupled to the transceiver and being configured to communicate with the identification system via the transceiver;
the transceiver and processor being contained in said housing; and
the onboard unit having a tampering protection unit which is split into two parts, the first part being contained in said housing and the second part being attachable to an inner surface of the windscreen;
wherein the first and the second part each comprise a limited range communication module for communication between said first and second parts; and
wherein the tampering protection unit is configured to detect a loss of communication between both communication modules and, upon detection, to trigger an alarm event in the first part.

Such an onboard unit can be used with any type of windscreen, i.e. also with a metallised windscreen when choosing suitable limited range communication modules, and the housing and said second part can easily be attached to the respective surfaces of the vehicle's windscreen. When attached, said second part is difficult to access as compared to the housing. Nevertheless, the detection of a detachment of the housing is very reliable as it is based on the communication loss between said first and second parts. By determining adequate provisions for the alarm event, the onboard unit can be protected against any kind of tampering, unauthorised use is prohibited and sensitive information is securely protected.

Beneficially, the housing further comprises a memory for storing application parameters, to which memory the processor is coupled, wherein the processor is configured to use said application parameters during communication with the identification system via the transceiver, and wherein said alarm event comprises disabling the use of said application parameters. Such application parameters can be or at least comprise specific access attributes including specific messages, an identification code for identifying a group affiliation, the vehicle, the user, and/or the onboard unit, an account number or even a credit value as known from the use of prepaid electronic purses. Using such application parameters the communication with and identification by the identification system can be simplified and accelerated and the accuracy and security of fee collection can be increased. Nevertheless, the unauthorised use of the application parameters is prohibited by disabling their use in case of detection of a loss of communication between both communication modules.

It is advantageous when said alarm event comprises blocking or destructing at least one of the processor, the transceiver and the memory. In this case, it is very difficult or even impossible to access or recover sensitive information, e.g. the application parameters, even in extensive and elaborate attempts.

According to an embodiment, said alarm event comprises setting a tampering flag for consideration by the processor. Thereupon, further provisions can be initiated, e.g. the processor disables further tasks or features of the onboard unit. Advantageously, said alarm event comprises sending, via the transceiver, at least one tampering message, which indicates that said tempering flag is set. Thereby, a tampered onboard unit can be identified from outside, e.g. by the identification system or an inspection device, and further measures can be taken.

In an embodiment, said alarm event comprises ignoring at least one polling message requesting said application parameters via the transceiver. By ignoring such a polling message, e.g. a request for toll payment received from the identification system via the transceiver, a fraudulent use of said application parameters is prohibited; the identification system could, in this case, react to such a non-compliant behaviour of the tampered onboard unit. Each of the aforementioned provisions improves the tampering protection effectively.

Another embodiment is distinguished in that the communication module of said first part is a reed contact and the communication module of said second part is a magnet. The reed contact is switched by the magnet, when falling below or exceeding a threshold in mutual distance, whereby a limited range magnetic communication is formed. This embodiment takes advantages of the specifically high robustness and durability of reed contacts and the ease of choosing a suitable magnet to determine said threshold during attaching the onboard unit.

According to a particular embodiment, the communication modules of said first and second parts are near field transceivers for establishing a wireless connection with each other, wherein the tampering protection unit is configured to detect said loss of communication in case of disruption of said wireless connection. In this case, even an extraordinarily subtle detachment of the housing from the vehicle's windscreen could not prevent the disruption of the wireless connection and thereby the detection of such tampering. Thus, the protection against any kind of tampering is particularly profound especially when the wireless connection is based on specific codes which cannot be recovered at reasonable effort.

Advantageously, said disruption is detected as an authentication failure during a pairing procedure of the wireless connection. Such an authentication failure can be detected based on predefined parameters, e.g. a measured bit error rate, drop rate or latency. By setting thresholds for such parameters, the detection of a disruption can be adjusted very accurately to the specific environmental requirements.

According to a variant of the aforementioned embodiments, the first part comprises an RFID or NFC reader and the second part comprises an RFID or NFC tag. RFID or NFC are reliable and economic and can easily be applied, especially when the onboard unit is attached to a non-metallised windscreen. In an alternative variant thereto, said wireless connection is a Bluetooth® connection. Near field transceivers according to the Bluetooth® standard are reliable and easily available also for very low power applications. Parasitic effects, e.g. signal reflection at openings of the vehicle's metallic body, facilitate the establishment of the near field wireless connection and achieve a sufficiently high link budget for a safe communication. In yet another variant, said wireless connection is an optical connection. Such an optical connection can advantageously be applied when attaching the onboard unit to any type of windscreen or transparent surface. The data transmission rate of optical connections may, for example, be high; thus, also complex and elaborate security protocols and codes can be implemented when using such an optical connection.

For making the onboard unit more flexibly usable, said second part may, for example, comprise at least one of an input and output device configured to communicate with the processor via said wireless connection. A one-way or two-way human-machine interface (HMI) can thereby be achieved.

To make the status of the onboard unit available to the user, also said housing can comprise at least one status LED controlled by at least one of the processor and the tampering protection unit. Thereby, the user can easily recognize the operation, operability or malfunction of the onboard unit. Said at least one status LED may be co-used for establishing said optical connection, whereby further devices for optically connecting said housing with said second part can be saved. When the housing and said second part are attached to the windscreen, said status LED may be visible through a sight of said second part. This facilitates the alignment of the housing and said second part during attachment to the vehicle. Moreover, the status indication can be effected through said sight, if necessary.

The transceiver for radio communication can be of any type, e.g. a WIFI®, Bluetooth® etc. transceiver. Optionally, the transceiver supports CEN DSRC, UNI DSRC, ETSI ITS-G5 or IEEE 802.11p WAVE communication standards. Thereby, the onboard unit can be used for conventional vehicular identification systems implemented according to the DSRC standards of CEN, UNI and ETSI, respectively, or the WAVE standard IEEE 802.11p.

BRIEF DESCRIPTION OF THE DRAWINGS/FIGURES

The disclosed subject matter will now be described in further detail by means of exemplary embodiments thereof under reference to the enclosed drawings in which.

DETAILED DESCRIPTION

Figure 1:
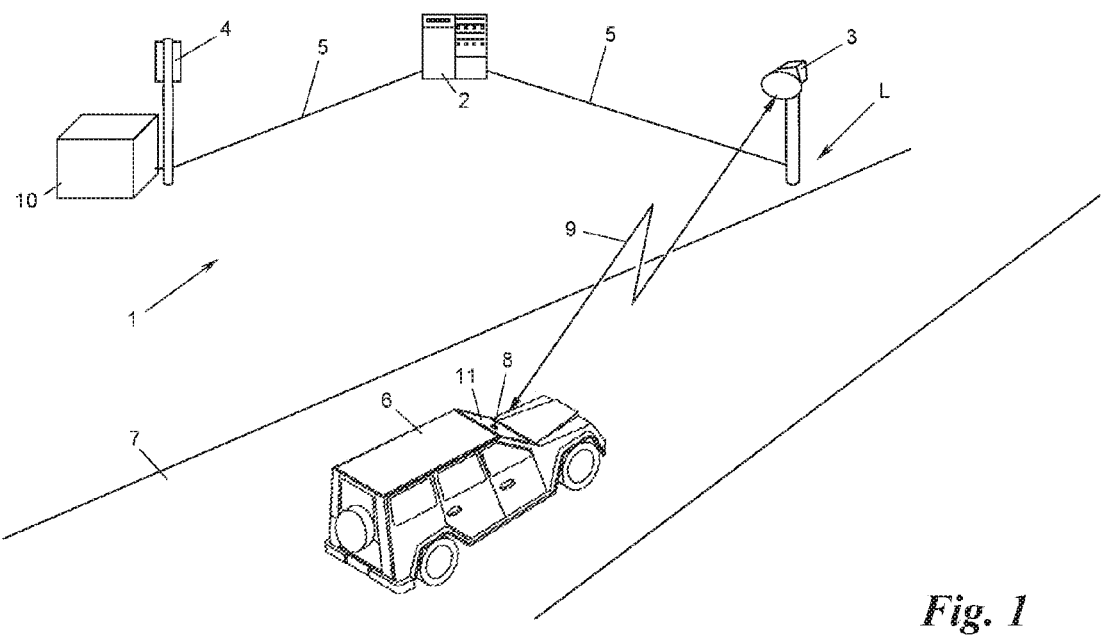
FIG. 1 shows a vehicle with an onboard unit according to the disclosed subject matter for use with a vehicular identification system in a schematic perspective view.

According to the example illustrated in FIG. 1, a vehicular identification system 1, in the present example a road toll system, comprises a central data processing centre 2 and at least one (here: two) transceivers 3, 4, which are in data connection 5 with the data processing centre 2. A vehicle 6 driving on a toll road 7 of the road toll system 1 carries an onboard unit 8 which is in radio communication 9 with the transceiver 3 of the identification system 1, thereby seeking authorisation to use the toll road 7 of the road toll system 1 and/or initiating or conducting a payment of a usage fee for the toll road 7 or another service. Other possible types of such an identification system 1 include a parking space management system or an access system for a restricted area, e.g. an inner city or non-public territory.

The radio communication 9 can, on the one hand, be based on a short range communication standard, e.g. DSRC standard according to CEN, UNI or ETSI ITS-G5 or WAVE standard IEEE 802.11p. In this case, the transmitter 3, the installation location L of which is known to the identification system 1, locates an onboard unit 8, which it is in radio communication 9 with, and the respective vehicle 6 based on said installation location L.

Figure 2A:
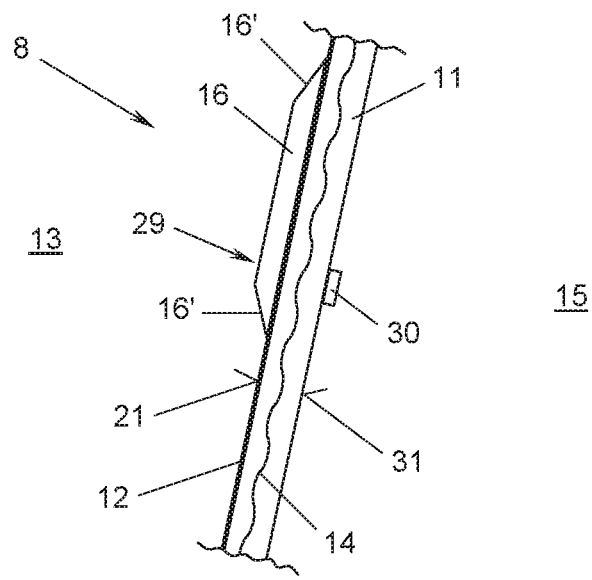
FIGS. 2a and 2b show different embodiments of the onboard unit of FIG. 1 attached to the vehicle's windscreen in a side view (FIG. 2a) and a plan view (FIG. 2b)
Figure 2B:
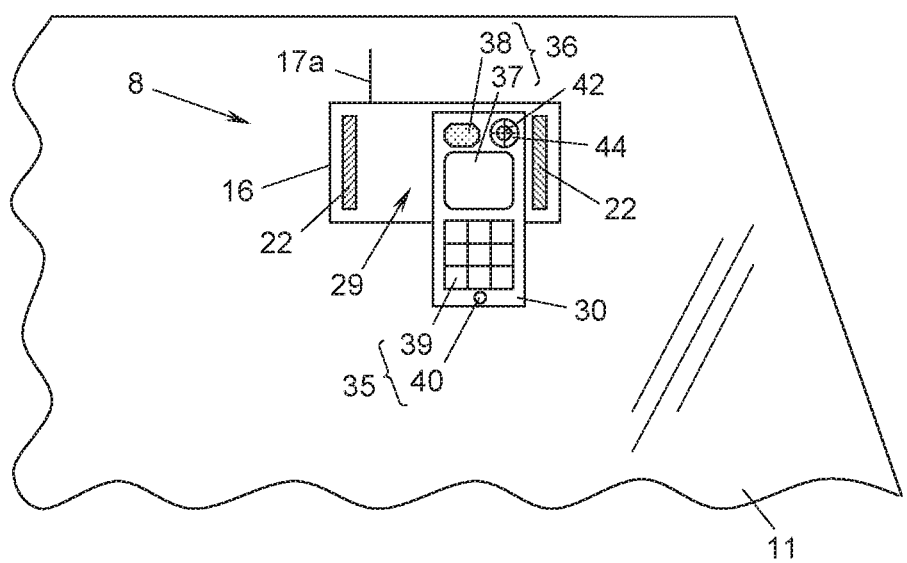
Figure 3:
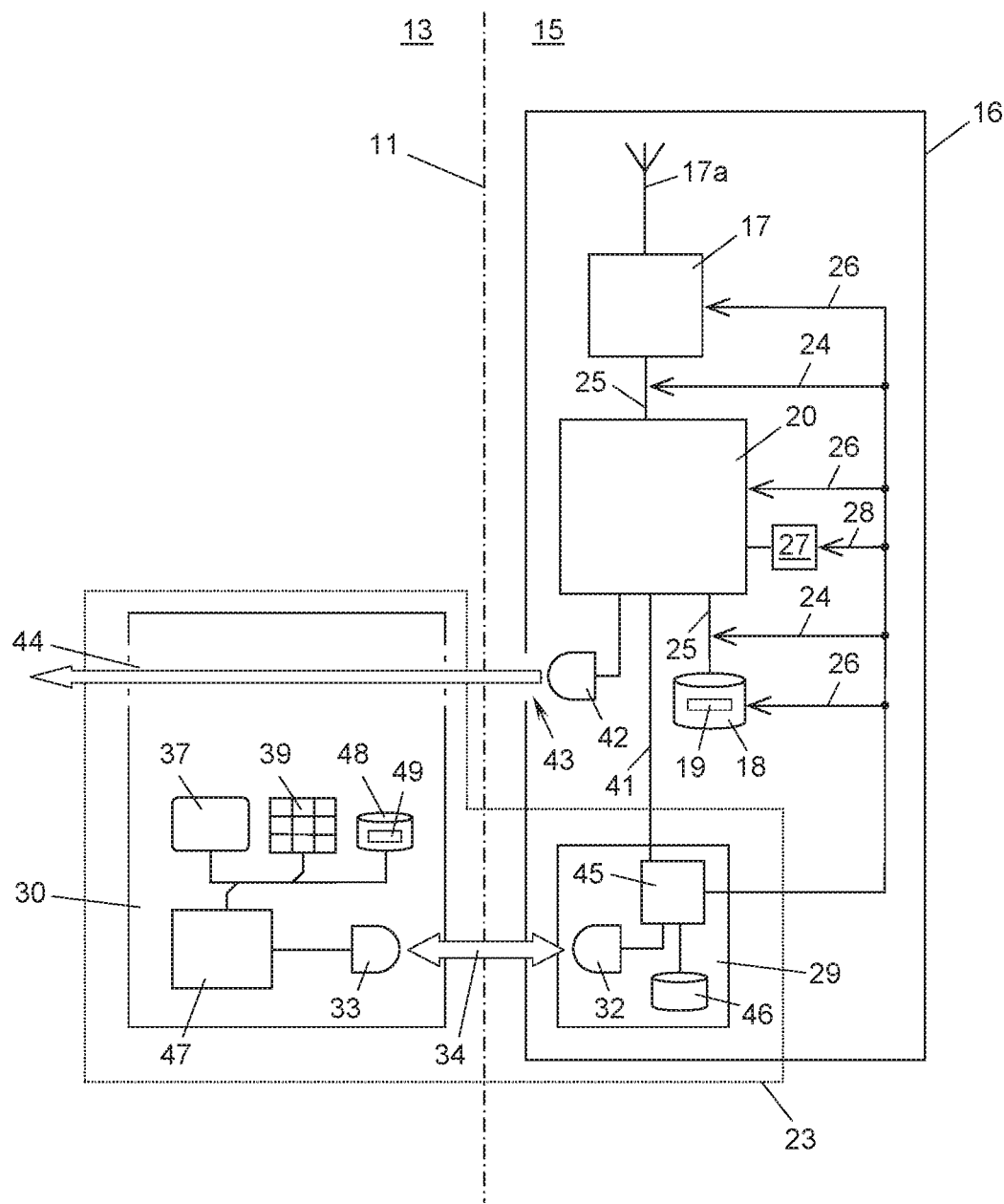
FIG. 3 shows another embodiment of the onboard unit of FIG. 1 in a schematic block diagram.

With reference to FIGS. 2a, 2b and 3, different embodiments of the onboard unit 8 for the vehicular identification system 1 shall now be described.

According to the example of FIG. 2a, the onboard unit 8 is attached to a windscreen 11 of the vehicle 6, which windscreen 11 is metallised by at least one of a metallic layer 12—in this example on the exterior 13 of the windscreen 11—and a defroster mesh 14 which, in this example, is integrated into the windscreen 11; metallic layer 12 or defroster mesh 14 could alternatively be applied to the interior 15 of the windscreen 11.

The onboard unit 8 comprises a housing 16, a transceiver 17 (FIG. 3) for radio communication 9 with the identification system 1 (FIG. 1), an optional memory 18 for storing application parameters 19, and a processor 20 coupled to the transceiver 17 and the memory 18. The processor 20 is configured to communicate with the identification system 1 via the transceiver 17, e.g. using said application parameters 19. The onboard unit 8 may comprise further components, e.g. a battery, an internal (FIG. 3) or external (FIG. 2b) antenna 17a of the transceiver 17, etc.

As illustrated in FIG. 3, the transceiver 17, memory 18 and processor 20 are contained in said housing 16, which is attached to an exterior surface of the windscreen 11 (FIG. 2a), e.g. by means of adhesive strips 22 (FIG. 2b) or similar. By attaching the housing 16 to the exterior surface 21 of the vehicle's windscreen 11, the reliability of the radio communication 9 with the identification system 1 is improved, especially in case of a metallised windscreen 11. For adaptation to the exterior surface 21, the edges 16' of the housing 16 can optionally be slanted as per the example of FIG. 2a and/or the housing 16 can be curved.

The application parameters 19 may be or comprise communication messages, an individual or a group identifier of a user, the onboard unit 8 and/or the vehicle 6, which messages or identifier(s) are known to the identification system 1 and can be used for identification and authorisation via the radio communication 9. The identification system 1, when positively identifying the received application parameters 19 and/or a standardized identifier of the onboard unit 8, authorizes the vehicle 6 with the identified onboard unit 8 individually or as belonging to an authorised group, respectively. Alternatively or in addition thereto, the application parameters 19 may comprise an account identification of the user of the onboard unit 8 for collection of usage fees, e.g. a road toll, or even a credit value, from which a certain amount can be deducted by the identification system 1 during the radio communication 9, in which latter case the onboard unit 8 and the user may remain anonymous to the identification system 1, while the vehicle 6 may be identified, if desired, e.g. by means of optical character recognition of its license plate.

The onboard unit 8 further comprises a tampering protection unit 23 which is split into two parts 29, 30, wherein the first part 29 is contained in said housing 16 and the second part 30 is attached to an inner surface 31 of the vehicle's windscreen 11 (FIG. 2a). The first and the second parts 29, 30 each comprise a limited range communication module for communication between said first and second parts 29, 30. Thusly, the tampering protection unit 23 detects a detachment of the housing 16 from the windscreen 11 by detecting a loss of communication between both communication modules and, upon detection, triggers an alarm event in the first part 29.

Said alarm event may comprise disabling the use of said application parameters 19, when available, e.g. by decoupling the processor 20 from at least one of the transceiver 17 and the memory 18, as symbolized by arrows 24 in FIG. 3 pointing at communication links 25 connecting the processor 20 with the transceiver 17 and the memory 19, respectively. Alternatively or in addition thereto, the alarm event may comprise, e.g. mechanically or electrically, blocking or even destructing at least one of the processor 20, the transceiver 17 and the memory 18 of the onboard unit 8, as symbolised by arrows 26 in FIG. 3, thereby also disabling the use of said application parameters 19. According to yet another embodiment, the alarm event may alternatively or additionally comprise setting a tampering flag 27 for consideration by the processor 20 as indicated by arrow 28 in FIG. 3. Such a flag 27 can then be used by the processor 20 for disabling the use of said application parameters 19 and/or for shutting down or disabling further functions and features of the onboard unit 8. In this case, the alarm event can also comprise sending at least one tampering message via the transceiver 17, which message, e.g., indicates that said tampering flag 27 is set, wherein at least some of the application parameters 19 can be included in or excluded from this tampering message; such a message can be sent on a periodic basis or at least once when in radio communication 9 with the identification system 1. The alarm event can alternatively comprise ignoring at least one polling message requesting said application parameters 19 via the transceiver 17.

Different types of limited range communication modules can be deployed for detecting a detachment of the housing 16 from the windscreen 11 as shall be exemplified below.

In the example of FIG. 2a, the communication module of said first part 29 is a reed contact which is closed when in close proximity of the communication module of said second part 30 which is a magnet, e.g. a permanent magnet. In this case, the strength of the magnetic field and the sensitivity of the reed contact constitute said limited range communication and can be selected as necessary, also taking into account potential magnetic attenuation of the windscreen 11.

According to a further embodiment of the tampering protection unit 23, a variant of which is illustrated in FIG. 3, the communication modules of said first and second parts 29, 30 are near field transceivers 32, 33 for establishing a wireless connection 34 with each other. In this embodiment, the tampering protection unit 23 detects said loss of communication in case of disruption of said wireless connection 34, while transmission power and/or reception sensitivity of the near field transceivers 32, 33 can be selected as necessary. The wireless connection 34 can be a permanent connection, a periodic connection or a connection which is activated when a radio communication 9 with the identification system 1 is established.

In one variant of the above mentioned embodiments, the first part 29 comprises an RFID or NFC reader and the second part 30 comprises an RFID or NFC tag, which can be an active of a passive tag as known in the art.

Alternatively, said wireless connection 34 is a Bluetooth® connection, wherein said near field transceivers 32, 33 operate according to Bluetooth® standards, or an optical connection, wherein each of the near field transceivers 32, 33 is constituted by at least one of an LED and a photo diode (as per the example of FIG. 3), depending on whether it is a one-way or a two-way wireless connection 34, or similar optical components.

As symbolised in FIG. 2b, said second part 30, which is attached to the inner surface 31 of the vehicle's windscreen 11, can further comprise at least one of an input and an output device 35, 36 for human-machine interfacing, e.g. a display 37, a speaker 38, a keyboard 39 and/or a microphone 40, which are configured to communicate with the processor 20 via said wireless connection 34 and, when the processor 20 has no direct access to this wireless connection 34 as it is the case in the example of FIG. 3, via said first part 29 and a communication link 41 with the processor 20.

As shown in FIG. 2b, said second part 30 may partly overlap said housing 16 when seen from the inside of the vehicle 6; in general, the second part 30 will either be much smaller (FIG. 2a) or be made about the same size as the housing 16 for covering the backside thereof.

As depicted in FIG. 3, said housing optionally comprises at least one status LED 42 which is controlled by at least one of the processor 20 (as in the present example) and the tampering protection unit 23, if necessary, also via the communication link 41 therebetween. The status LED 42 is visible to the user through the windscreen 11 and a transparent window 43 in the housing 16 by suitably arranging or directing status LED 42, transparent window 43 and housing 16.

According to a variant not shown in FIG. 3, the at least one status LED 42 is co-used for establishing said wireless optical connection 34, i.e. it is used for both displaying the status and establishing said wireless connection 34.

In an example in which said second part 30 exceeds a certain size, it may comprise a sight 44 (FIG. 3), through which the status LED 42 is visible, whether or not co-used for establishing said optical connection 34.

In the example of FIG. 3, the first part 29 of the tampering protection unit 23 has a controller 45 connected to and controlling a storage 46 and the near field transceiver 32 (here: LED and photo diode). Similarly, the near field transceiver 33 (again: LED and photo diode) of said second part 30 is controlled by another controller 47 in connection therewith and with the exemplary display 37 and keyboard 39 and a storage 48 containing at least one code 49.

While the tampering protection unit 23, i.e. the controller 45 of the first part 29, can detect said disruption of the wireless communication 34 by simply recognizing that no wireless connection 34 is in place or can be established, the disruption can also be detected as an authentication failure during a pairing procedure using, e.g., such a code 49 or a code series.

When using a code 49 for paring, the code 49 can be sent to the controller 45 of the first part 29 and stored there in the storage 46 during an initialisation of the onboard unit 8 or, on the other hand, it can be generated by the controller 45 of the first part 29 during the initialisation and thereupon be sent to the second part 30 where it is stored in the storage 48. During communication over the wireless connection 34, the second part 30, when said pairing is applied, adds said code 49 to its message; when receiving such a message, the controller 45 of the first part 29 checks for the code 49 and compares it with the one stored in its own storage 46. As known in the art, a series of codes can be used similarly.

When the received code 49 is not identical, a code series does not match or no code or even no reply is received, or when a measured bit error rate, drop rate and/or latency falls below a predetermined threshold, the tampering protection unit 23 detects said disruption.

CONCLUSION

The disclosed subject matter is not limited to specific embodiments described in detail above but composes all variants, modifications and combinations thereof which fall into the scope of the appended claims.

What is claimed is:

1. An onboard unit for use with a vehicular identification system, the onboard unit comprising:
    a housing attachable to an exterior surface of a windscreen of a vehicle;
    a transceiver for radio communication with the vehicular identification system; and
    a processor coupled to the transceiver and being configured to communicate with the vehicular identification system via the transceiver;
    the transceiver and processor being contained in said housing;
    wherein the onboard unit further comprises a tampering protection unit which is split into two parts, the first part being contained in said housing and the second part being attachable to an inner surface of the windscreen;
    wherein the first and the second part each comprise a near field transceiver, wherein said near field transceivers are configured to establish a wireless connection between said first and second parts when a radio connection with the vehicular identification system is established; and
    wherein the tampering protection unit is configured to detect a disruption of said wireless connection and, upon detection, to trigger an alarm event in the first part.

2. The onboard unit according to claim 1, wherein the housing further comprises a memory for storing application parameters, to which memory the processor is coupled, wherein the processor is configured to use said application parameters during communication with the identification system via the transceiver, and wherein said alarm event comprises disabling the use of said application parameters.

3. The onboard unit according to claim 1, wherein said alarm event comprises blocking or destructing at least one of the processor and the transceiver.

4. The onboard unit according to claim 1, wherein said alarm event comprises setting a tampering flag for consideration by the processor.

5. The onboard unit according to claim 4, wherein said alarm event comprises sending, via the transceiver, at least one tampering message, which indicates that said tempering flag is set.

6. The onboard unit according to claim 2, wherein said alarm event comprises ignoring at least one polling message requesting said application parameters via the transceiver.

7. The onboard unit according to claim 1, wherein said disruption is detected as an authentication failure during the wireless connection.

8. The onboard unit according to claim 1, wherein the first part comprises an RFID or NFC reader and the second part comprises an RFID or NFC tag.

9. The onboard unit according to claim 1, wherein said wireless connection is a Bluetooth connection.

10. The onboard unit according to claim 1, wherein said wireless connection is an optical connection.

11. The onboard unit according to claim 1, wherein said second part comprises at least one of an input and output device configured to communicate with the processor via said wireless connection.

12. The onboard unit according to claim 1, wherein said housing comprises at least one status LED controlled by at least one of the processor and the tampering protection unit.

13. The onboard unit according to claim 1, wherein the transceiver supports at least one of a CEN DSRC, UNI DSRC, ETSI ITS-G5 or IEEE 802.11p WAVE communication standard.

14. The onboard unit according to claim 2, wherein said alarm event comprises blocking or destructing at least one of the processor, the transceiver and the memory.

15. An onboard unit for use with a vehicular identification system, the onboard unit comprising:
- a housing attachable to an exterior surface of a windscreen of a vehicle;
- a transceiver for radio communication with the vehicular identification system; and
- a processor coupled to the transceiver and being configured to communicate with the vehicular identification system via the transceiver;
- the transceiver and processor being contained in said housing;
- wherein the onboard unit further comprises tampering protection unit which is split into two parts, the first part being contained in said housing and the second part being attachable to an inner surface of the windscreen;
- wherein the first and the second part each comprise a limited range communication module for communication between said first and second parts;
- wherein the tampering protection unit is configured to detect a loss of communication between both communication modules and, upon detection, to trigger an alarm event in the first part; and
- wherein the housing further comprises a memory for storing application parameters, to which memory the processor is coupled, wherein the processor is configured to use said application parameters during communication with the identification system via the transceiver, and wherein said alarm event comprises disabling the use of said application parameters.

16. The onboard unit according to claim 15, wherein said alarm event comprises blocking or destructing at least one of the processor and the transceiver.

17. The onboard unit according to claim 15, wherein said alarm event comprises setting a tampering flag for consideration by the processor.

18. An onboard unit for use with a vehicular identification system, the onboard unit comprising:
- a housing attachable to an exterior surface of a windscreen of a vehicle;
- a transceiver for radio communication with the vehicular identification system; and
- a processor coupled to the transceiver and being configured to communicate with the vehicular identification system via the transceiver;
- the transceiver and processor being contained in said housing;
- wherein the onboard unit further comprises a tampering protection unit which is split into two parts, the first part being contained in said housing and the second part being attachable to an inner surface of the windscreen;
- wherein the first and the second part each comprise a limited range communication module for communication between said first and second parts;
- wherein the tampering protection unit is configured to detect a loss of communication between both communication modules and, upon detection, to trigger an alarm event in the first part; and
- wherein the first part comprises an RFID or NFC reader and the second part comprises an RFID or NFC tag.

19. The onboard unit according to claim 18, wherein said disruption is detected as an authentication failure during the wireless connection.

20. The onboard unit according to claim 18, wherein the housing further comprises a memory for storing application parameters, to which memory the processor is coupled, wherein the processor is configured to use said application parameters during communication with the identification system via the transceiver, and wherein said alarm event comprises disabling the use of said application parameters.

21. The onboard unit according to claim 18, wherein said alarm event comprises blocking or destructing at least one of the processor and the transceiver.

22. The onboard unit according to claim 18, wherein said alarm event comprises setting a tampering flag for consideration by the processor.

23. The onboard unit according to claim 18, wherein said second part comprises at least one of an input and output device configured to communicate with the processor via said wireless connection.

* * * * *